United States Patent [19]
DuBois et al.

[11] Patent Number: 5,338,802
[45] Date of Patent: Aug. 16, 1994

[54] LOW TEMPERATURE CONVERSION OF POLYMERIZED ESTERS

[75] Inventors: Donn A. DuBois; Robert J. Sutherland, both of Houston, Tex.

[73] Assignee: Shell Oil Company, Houston, Tex.

[21] Appl. No.: 904,152

[22] Filed: Dec. 21, 1992

[51] Int. Cl.$^5$ .................. C08F 293/00; C08F 297/02; C08F 267/06
[52] U.S. Cl. .................... 525/299; 525/271; 525/329.9
[58] Field of Search ............. 525/299, 329.9, 271

[56] References Cited

U.S. PATENT DOCUMENTS

| | | |
|---|---|---|
| 3,359,345 | 12/1957 | Doak et al. . |
| 3,639,521 | 2/1972 | Hsieh . |
| 3,890,408 | 6/1975 | Schepers et al. . |
| 4,029,720 | 6/1977 | Seiler et al. . |
| 4,080,406 | 3/1978 | Kelsey . |
| 4,246,374 | 1/1981 | Kopchik . |
| 4,461,874 | 7/1984 | Teyssie et al. . |
| 4,530,973 | 7/1985 | Koster et al. . |
| 4,695,607 | 9/1987 | Spinelli . |
| 4,786,689 | 11/1988 | Lund et al. . |
| 4,788,361 | 11/1988 | Olson et al. . |
| 4,794,145 | 12/1988 | Lund et al. . |

FOREIGN PATENT DOCUMENTS

| | | |
|---|---|---|
| 298667 | 1/1989 | European Pat. Off. . |
| 307818 | 3/1989 | European Pat. Off. . |
| 356249 | 2/1990 | European Pat. Off. . |
| 1212987 | 11/1970 | United Kingdom . |

OTHER PUBLICATIONS

Encyclopedia of Polymer Science and Eng. J. Wiley and Sons, N.Y., 1988, vol. 8, pp. 536–537.

Primary Examiner—James J. Seidleck
Assistant Examiner—I. Zemel
Attorney, Agent, or Firm—Keith M. Tackett

[57] ABSTRACT

Polymers comprising anionically polymerized conjugated dienes or vinylarenes and adjacent units of (1-methyl-1-alkyl)alkyl esters such as t-butylmethacrylate or (1-aryl-1-alkyl)alkyl esters, as well as selectively hydrogenated derivatives thereof, are heated to at least 170° C. in the presence of an amine to convert the polymerized ester to amide and imide groups.

14 Claims, No Drawings

LOW TEMPERATURE CONVERSION OF POLYMERIZED ESTERS

FIELD OF THE INVENTION

This invention relates to polymers having amide or imide groups. More particularly, the invention relates to polymers comprising polymerized methacrylates that are reacted with amines to form amides or imides.

BACKGROUND OF THE INVENTION

Conversion of acrylic groups in acrylic polymers to imide groups is described in U.S. Pat. No. 4,246,374 which teaches reaction of the acrylic group with anhydrous ammonia or an anhydrous primary amine. The conversion reaction occurs between outer limits of about 200° C. and 450° C.

Conversion of the acrylic groups to amide and imide groups will occur in the presence of other monomer units such as styrene, butadiene, or isoprene. However, butadiene and isoprene units in the polymers thermally degrade at temperatures between about 200° C. and 450° C. Conversion of acrylic groups to amide and imide groups at lower temperatures is necessary to reduce degradation of polymers containing butadiene or isoprene.

SUMMARY OF THE INVENTION

Conversion of polymerized (1-methyl-1-alkyl)alkyl esters, such as polymerized t-butylmethacrylate, or polymerized (1-aryl-1-alkyl)alkyl esters to amide and imide groups by reaction with ammonia or a primary amine occurs at temperatures substantially below 200° C. Polymers containing blocks of the (1,1-substituted)alkyl esters and blocks of conjugated dienes have been reacted with primary amines at temperatures as low as 180° C. with significant conversion to amide and imide groups.

DESCRIPTION OF THE INVENTION

The novel polymers of the invention are produced from base polymers, or selectively hydrogenated derivatives thereof, comprising either a polymerized conjugated diene or a polymerized vinylarene and adjacent polymerized units of a (1,1-substituted)alkyl ester selected from the group consisting of (1-methyl-1-alkyl)alkyl esters and (1-aryl-1-alkyl)alkyl esters. The (1,1-substituted)alkyl esters convert to amide and imide groups when reacted with primary or secondary amines. The base polymers are generally described in U.S. patent No. 5,218,053 which is incorporated by reference herein.

The base polymers of the invention are exemplified by the following structures:

$$A\text{—}M \quad (I)$$
$$B\text{—}M \quad (II)$$
$$A\text{—}M\text{—}A \quad (III)$$
$$B\text{—}M\text{—}B \quad (IV)$$
$$M\text{—}B\text{—}M \quad (V)$$
$$(B\text{—}M\text{—})_y\text{—}X \quad (VI)$$
$$(M\text{—}B\text{—})_y\text{—}Z \quad (VII)$$
$$A\text{—}B\text{—}M \quad (VIII)$$
$$B\text{—}A\text{—}M \quad (IX)$$
$$A\text{—}B\text{—}A\text{—}M \quad (X)$$
$$B\text{—}A\text{—}B\text{—}M \quad (XI)$$
$$A\text{—}B\text{—}A\text{—}B\text{—}M \quad (XI)$$
$$M\text{—}A\text{—}B\text{—}A\text{—}M \quad (XII)$$
$$(A\text{—}B\text{—}M\text{—})_y\text{—}X \quad (XIV)$$
$$(M\text{—}A\text{—}B\text{—})_y\text{—}Z \quad (XV)$$
$$(M\text{—}B\text{—}A\text{—})_y\text{—}Z \quad (XVI)$$
$$(A\text{—})_y\text{—}Z\text{—}(\text{—}M)_{y'} \quad (XVII)$$
$$(B\text{—})_y\text{—}Z\text{—}(\text{—}M)_y \quad (XVIII)$$

wherein each A is a block or segment comprising a preponderance of a polymerized vinylarene, each B is a block or segment:: comprising a preponderance of a polymerized conjugated diene, each M is a segment or block comprising at least two adjacent units of the polymerized (1,1-substituted)alkyl ester, y and y' are integers representing multiple arms in a star configuration wherein y'≦i y, X is the residue of a polyfunctional couplinq agent, and Z is a crosslinked core of a polyfunctional coupling agent or a polyfunctional polymerization initiator.

The base polymers are further exemplified by the formula

$$(C\text{—})_t\text{—}Z\text{—}(\text{—}M)_s \quad (XIX)$$

wherein Z and M have the same definition above, C comprises a preponderance of a polymerized conjugated diene, s is at least 3, and t is at least 3. The polymerized conjugated diene in C may also be hydrogenated.

The vinylarene employed as each A block or segment in the above structures is a hydrocarbon compound of up to 18 carbon atoms having an alkenyl group of up to 6 carbon atoms attached to a ring carbon atom of an aromatic ring system of up to 2 aromatic rings. Such vinylarenes are illustrated by styrene, 2-butenylnaphthalene, 4-t-butoxystyrene, 3-isopropenylbiphenyl, and isopropenyl-napthalene. The preferred vinylarenes have an alkenyl group of up to 3 carbon atoms. attached to a benzene ring as exemplified by styrene and styrene homologs such as styrene, α-methylstyrene, p-methylstyrene, and α,4-dimethylstyrene. Styrene, p-methylstyrene, and α-methylstyrene are particularly preferred vinylarenes, especially styrene.

Each A block or segment of the polymers is preferably at least 80% by weight polymerized alkenyl aromatic compound and is most preferably homopolymeric.

Each B block or segment in the above structures preferably comprises at least 90% by weight of the polymerized conjugated diene. Most preferably, the B segments or blocks are homopolymeric. The conjugated dienes preferably have up to 8 carbon atoms. Illustrative of such conjugated dienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated dienes are butadiene and isoprene, particularly butadiene. Within the preferred B blocks or segments, the percentage of units produced by 1,4 polymerization is at least about 5% and preferably at least about 20%.

The polymeric arm C in formula XVIII above comprises a preponderance of the conjugated diene as described for the B blocks or segments. Each C may include blocks of the vinylarene such that C may be represented by A—B— or B—A— wherein A and B are as previously defined.

Each M is preferably a methacrylate block or segment comprising at least two adjacent units of a polymerized (1,1-substituted)alkyl ester selected from a group comprising (1-methyl-1-alkyl)alkyl methacrylates and (1-aryl-1-alkyl)alkyl methacrylates. Homopolymeric M segments or blocks of the (1-methyl-1-alkyl)methacrylates are most preferred.

The (1,1-substituted)alkyl esters have the following structures:

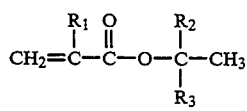
(A)

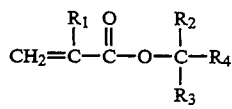
(B)

wherein $R_1$ is hydrogen or an alkyl or aromatic group comprising from 1 to 10 carbon atoms, $R_2$ is an alkyl group comprising from 1 to 10 carbon atoms, $R_3$ is an alkyl group comprising from 1 to 10 carbon atoms, and $R_4$ is aryl, alkyl substituted aryl, or alkoxy substituted aryl comprising from 6 to 15 carbon atoms.

The preferred methacrylates have the structure:

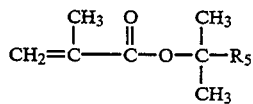
(C)

wherein $R_5$ is an alkyl group comprising from 1 to 10 carbon atoms, most preferably methyl. The most preferred alkyl esters have methyl for $R_2$ and $R_3$ since both $R_2$ and $R_3$ are removed from the polymer upon conversion of adjacent ester groups to amide or imide groups and selection of methyl groups results in a volatile by-product that is easily removed from the polymer.

Adjacent (1-methyl-1-alkyl)alkyl ester groups convert to stable anhydride rings having six members after upon heating of the polymer to a temperature in excess of 180° C. Thermal conversion to anhydride rings likely occurs during reaction of the base polymers with amines as described below facilitating formation of amide and imide groups.

Examples of the (1-methyl-1-alkyl) alkyl esters of Formula A include:
1,1-dimethylethylacrylate (t-butylacrylate),
1,1-dimethylpropylacrylate (t-pentylacrylate),
1,1-dimethylethyl-α-propylacrylate,
1-methyl-1-ethylpropyl-α-butylacrylate,
1,1-dimethylbutyl-α-phenylacrylate,
1,1-dimethylpropyl-α-phenylacrylate (t-pentylatropate),
1,1-dimethylethyl-α-methylacrylate, (t-butylmethylacrylate), and
1,1-dimethylpropyl-α-methylacrylate (t-pentylmethacrylate).

The preferred methacrylates of Formula C include:
1,1-dimethylethyl-α-methylacrylate, (t-butylmethylacrylate), and
1,1-dimethylpropyl-α-methylacrylate (t-pentylmethacrylate).

The most preferred alkyl ester is t-butylmethacrylate which is commercially available in high purity from Mitsubishi-Rayon, Japan. Less pure t-butylmethacrylate is available from Monomer, Polymer and Dajac and can be used if passed through a column of alumina and 13× zeolite to remove methacrylic acid and t-butylalcohol. The preferred zeolites have a cavity size no less than 10 angstroms such as Zeolite 13X which has the formula $Na_{86}(AlO_2)_{86}(SiO_2)_{106}.267H_2O$.

Mixtures of the alkyl esters of Formula A or B and other esters, which do not readily convert to ester groups at low temperatures, such as isobutylmethylacrylate (3-methylpropyl-α-methylacrylate), can be used if M blocks having both ester and amide or imide functional groups are desired. Alternatively, the amine stoichiometry, reaction temperature, and residence time can be reduced to afford a mixed block unreacted ester and amide or imide groups. In addition, reaction conditions can be varied to afford mixed blocks of anhydride and amide or imide groups.

The processes for producing the polymers of Formula I–XIX are, at least in part, rather particular because of the tendency of the ester groups to undergo side reactions with polymer lithium species. In the process of producing a more conventional polymer, e.g., a block polymer of styrene and 1,3-butadiene, a variety of process schemes are available. Such procedures include the production by anionic polymerization of a living polymer of either type of monomer before crossing over to the polymerization of the other type of monomer. It is also conventional to produce such block polymers by sequential polymerization or by the use of coupling agents to obtain branched or radial polymers. In the production of the polymers of the invention, the aliphatic and aromatic portions are produced by sequential polymerization and the ester block is then produced as a final polymerization step prior termination or any addition of coupling agents.

In each procedure to form a polymer of Formula I, III, IV, VI, VIII, IX, X, XI, XII, or XIV, the monomers are anionically polymerized in the presence of a metal alkyl initiator, preferably an alkali metal alkyl. The use of such initiators in anionic polymerizations is well known and conventional. A particularly preferred initiator is secbutyllithium.

The polymerization of the alkenyl aromatic compounds takes place in a non-polar hydrocarbon solvent such as cyclohexane or in mixed polar/non-polar solvents, e.g., mixtures of cyclohexane and an ether such as tetrahydrofuran or diethyl ether. Suitable reaction temperatures are from about 20° C. to about 80° C. and the reaction pressure is sufficient to maintain the mixture in the liquid phase. The resulting product includes a living poly(alkenyl aromatic compound) block having a terminal organometallic site which is used for further polymerization.

The polymerization of the conjugated alkadiene takes place in a solvent selected to control the mode of polymerization. When the reaction solvent is non-polar, the desired degree of 1,4 polymerization takes place whereas the presence of polar material in a mixed solvent results in an increased proportion of 1,2 polymerization. Polymers resulting from about 6% to about 95% of 1,2 polymerization are of particular interest. In the case of 1,4 polymerization, the presence of ethylenic unsaturation in the polymeric chain results in cis and trans configurations. Polymerization to give a cis configuration is predominant.

Polymerization of the esters takes place in the mixed solvent containing the polymerized conjugated alkadiene at a temperature from about −80° C. to about 100° C., preferably from about 10° C. to about 50° C.

Subsequent to production of the acrylic block or segment, the polymerization is terminated by either reaction with a protic material, typically an alkanol such as methanol or ethanol (Formula I, II, VI, IX, X, XI, and XII), or with a coupling agent, typically dibromomethane or divinylbenzene (Formula III, IV, VI, and XIV). Coupling with a polymerizable monomer such as divinylbenzene does not terminate the polymerization reaction. Termination to remove the lithium is preferred after coupling with divinylbenzene although additional arms can be grown from the lithium sites before termination if desired (e.g. Formula XIX). The polymers are then recovered by well known procedures such as precipitation or solvent removal.

The polymers produced by the above procedures will undergo some coupling through an ester group on an adjacent living polymer molecule prior to termination unless (1) the living polymer chains are first end-capped with a unit of 1,1-diphenylethylene or α-methylstyrene or (2) the polymer has a star structure wherein the arms containing the methacrylate are shorter than the other polymeric arms. Ester coupling occurs in about 10–50% of the polymer by weight if left unchecked. Such coupling is often acceptable, particularly when the desired polymer structure requires coupling after polymerization of the esters. (Formula III, IV, VI, and XIV).

The production of the polymers of Formula V and XIII is somewhat different procedurally, although the process technology is broadly old. In this modification, conjugated alkadiene is polymerized in the presence of a difunctional initiator, e.g., 1,3-bis(1-lithio-1,3-dimethylpentyl)benzene, to produce a living polyalkadiene species with two reactive organometallic sites. This polymeric species is then reacted with the remaining monomers to produce the indicated structures.

The production of the polymers of Formula VII and XV–XIX is also different procedurally, although the process technology again is broadly old. In this modification, a multifunctional initiator identified as core Z is first produced by coupling an alkyl lithium or living polymer molecules with divinylbenzene to provide numerous organometallic sites for further polymerization.

Each B segment or block has a molecular weight from 2,000 to 500,000 prior to any coupling, preferably from 2,000 to 200,000. Each A block has a molecular weight from 500 to 30,000 prior to any coupling, preferably from 1,000 to 20,000. Each non-coupled M segment or block has a molecular weight from 300 to 100,000, preferably from 300 to 30,000, prior to conversion to an anhydride.

In a further modification of the base polymers containing a conjugated diene, the base polymers are selectively hydrogenated to reduce the extent of unsaturation in the aliphatic portion of the polymer without substantially reducing the aromatic carbon-carbon unsaturation of any aromatic portion of the block copolymer. However, in some cases hydrogenation the aromatic ring is desired. Thus, a less selective catalyst will work.

A number of catalysts, particularly transition metal catalysts, are capable of selectively hydrogenating the aliphatic unsaturation of a copolymer of an alkenyl aromatic compound and a conjugated alkadiene, but the presence of the M segment or block can make the selective hydrogenation more difficult. To selectively hydrogenate the aliphatic unsaturation it is preferred to employ a "homogeneous" catalyst formed from a soluble nickel compound and a trialkylaluminum. Nickel naphthenate or nickel octoate is a preferred nickel salt. Although this catalyst system is one of the catalysts conventionally employed for selective hydrogenation absent alkyl methacrylate blocks, other "conventional" catalysts are not suitable for selective hydrogenation of the conjugated alkadienes in the ester containing polymers.

In the selective hydrogenation process, the base polymer is reacted in situ, or if isolated is dissolved in a suitable solvent such as cyclohexane or a cyclohexane-ether mixture and the resulting solution is contacted with hydrogen gas in the presence of the homogeneous nickel catalyst. Hydrogenation takes place at temperatures from about 25° C. to about 150° C. and hydrogen pressures from about 15 psig to about 1000 psig. Hydrogenation is considered to be complete when least about 90%, preferably at least 98%, of the carbon-carbon unsaturation of the aliphatic portion of the base polymer has been saturated, as can be determined by nuclear magnetic; resonance spectroscopy. Under the conditions of the selective hydrogenation no more than about 5% and preferably even fewer the units of the A blocks will have undergone reaction with the hydrogen. The selectively hydrogenated block polymer is recovered by conventional procedures such as washing with aqueous acid to remove catalyst residues and removal of the solvent and other volatiles by evaporation or distillation.

The amide and imide groups in the polymers of the invention are produced by heating the base polymers to a temperature in excess of 170 ° C. in the presence of a primary or secondary amine. Heating is preferably conducted in an extruder having a devolatization section to remove the volatile by-products formed by conversion of the ester groups to amide imide groups.

Primary amines useful for the invention include compounds having the structure R-NH$_2$ as described in column 3, lines 32-62, of U.S. Pat. No. 4,246,374 which disclosure is incorporated by reference herein. The most preferred primary amine is N,N-diethylaminopropylamine (DAP). Secondary amines having the structure R'R"—NH will convert the ester groups to amide groups but are not preferred.

The polymers preferably have peak molecular weights between 1,000 and 2,000,000 after conversion to amide and imide groups as measured by gel permeation chromatography.

The amide or imide functionalized polymers of the invention, like the base copolymers, contain polar groups and have utilities conventional for such polymers. The polar polymers are particularly useful in blends with engineering thermoplastics, asphalt compositions, oils, adhesive formulations, including laminating adhesives for flexible packaging, sealants, fibers, and coatings formulations, especially coatings based on water emulsions. Examples of useful products include viscosity index improvers for motor oils and adhesives for tapes, labels, decals, and mastics. The polymers of the invention demonstrate significantly improved resistance to atmospheric hydrolysis in comparison to maleic anhydride modified polymers which have some of the same utilities.

The invention is further illustrated by the following Illustrative Embodiments which should not be construed as limiting.

EXAMPLE 1

In this example, a selectively hydrogenated base polymer having the structure A-B-A-M was produced by sequential polymerization. Each A is a homopolymer block of styrene having a peak molecular weight of 7,500, B is a hydrogenated homopolymer block of butadiene having a peak molecular weight prior to hydrogenation of 35,000, and M is a block of t-butylmethacrylate having a peak molecular weight of 5,000. The base polymer contained 30% couple polymer having the structure A-B-A-M-A-B-A.

The base polymer was reacted with N,N-diethylaminopropylamine (DAP) in a 15mm twin screw extruder at 240° C. with a residence time of approximately 25 seconds. The DAP was sprayed on the polymer crumb prior to feeding into the extruder. The amount of DAP was maintained at the ratio of 2 mols of the t-butylmethacrylate to each mole of the DAP.

The product was slightly brown in color and soluble in hexane and tetrahydrofuran. Infrared analysis showed that the main product was the amide derivative of the ester as characterized by an intense absorption at 1669 cm$^{-2}$.

EXAMPLE 2

Using the same basic experimental procedure described in Example 1, octadecylamine was used in place of DAP at a ratio of 1 mol of octadecylamine per 1 mol of t-butylmethacrylate. After extrusion, the product also showed a strong amide absorption at 1669.5 cm$^{-1}$.

EXAMPLE 3

This example describes production of a polymer having the structure B-A-M wherein B is hydrogenated isoprene, A is styrene, and M is t-butylmethacrylate. A two liter Büchi reactor was charged with 1500 ml of cyclohexane at 25° C. and 80 grams of isoprene monomer. Then impurities were titrated with sec-butyllithium. The temperature was increased to 60° C. and 0.6 grams of 12.11 wt % sec BuLi was added to the mixture, and reacted for 30 minutes. Still at 60° C., 34.3 grams of styrene monomer was added and reacted for 20 minutes. The temperature was decreased to 35° C. and the styrene was reacted for another 20 minutes. Next 2.3 grams of tert-butyl-methacrylate was added at 50° C. and allowed to react for 20 minutes. The reaction was killed with 0.09 ml of methanol prior to hydrogenation.

The polymer solution was then hydrogenated with a nickel catalyst composed of nickel octoate reduced by triethyl aluminum (Al/Ni=2.3:1). The resulting product showed a 96.9% conversion of double bonds to single bonds in the isoprene block. GPC shows 42% coupled material (B-A-M-A-B) in the product.

Following hydrogenation, the polymer was melt modified in a Brabender mixing head at 250° C. for 3 minutes in the presence of a slight excess of a 50/50 mixture of oil and DAP. The resulting products showed complete conversion of the alkyl groups on the methacrylate block to amide groups.

EXAMPLE 4

This example describes production of a polymer having the structure B-A-M wherein B is hydrogenated isoprene, A is styrene, and M is t-butylmethacrylate. A two liter Büchi reactor was charged with 1500 ml of cyclohexane and 80 grams isoprene monomer. The stirred solution was titrated with approximately 1 ml of 12.11 wt % sec-butyllithium. After titration the target amount of sec-butyllithium (0.60 grams 12.11% sec-butyllithium) was added and the isoprene was allowed to polymerize for 1 hour at 45° C. Then 34.3 grams of styrene monomer was added and allowed to polymerize for 45 minutes, with the temperature being reduced to 25° C. during the styrene polymerization. When the styrene block finished polymerizing 2.3 grams of tert-butylmethacrylate (tBMA) monomer was added and allowed to react for 15 minutes. Then 0.05 ml of methanol was added to kill the reaction.

The polymer solution was then hydrogenated with the nickel catalyst. The resulting product showed a 98.6% conversion of the double bonds in the isoprene block. GPC showed 18% coupled material (B-A-M-A-B) in the product.

The t-butyl groups on the polymer were acidified in a refluxing toluene solution for 3 hours with a catalytic amount of pTSA. The acidified polymer was then reacted with DAP at a small stoichiometric excess. The amine salt of the polymer was then recovered by precipitation with methanol and dried in a vacuum oven. The amine salt of the polymer was then heated in the Brabender mixing head at 250° C. for 3 minutes to form the amide derivative of the polymer.

EXAMPLE 5

This example describes production of a base block polymer having the structure $(A—B—)_y—Z—(—M)_y$, wherein A is styrene, B is hydrogenated isoprene, M is t-butylmethacrylate, and Z is a core of divinylbenzene. A first reactor was charged with 270 pounds of cyclohexane and 30 pounds of styrene monomer. To the stirred mixture 6.5 pounds of sec-butyllithium was added and the styrene was polymerized for 10 half-lives at 60° C.

In a second reactor 273 pounds of cyclohexane and 50 pounds of isoprene monomer were titrated with sec-butyllithium to remove any impurities. Then 27 pounds of the living homopolystyrene from step 1 was added to the isoprene and the isoprene was polymerized for 12 half-lives at 60° C. Next, 200 ml of divinylbenzene (55% dvb) was added to the living styrene-isoprene polymeric arms and reacted at 80° C. for 30 minutes to form the living star polymer.

The temperature of the star polymer mixture was lowered to 35° C. and 1.20 pounds of tert-butylmethacrylate (tBMA) was added to the reaction. The tBMA was polymerized for 30 minutes at 35° C. to form the second polymeric arms, and the reaction was quenched with 19 ml of methanol.

The star polymer of Example 1 was hydrogenated using a catalyst composed of nickel octoate reduced by triethyl aluminum. The ratio of nickel to aluminum for this particular example was 1:2.3. The total catalyst charge was periodically increased to give a product with low residual unsaturation.

EXAMPLE 6

This example describes production of a base block polymer having the structure $(B-)_y-Z-(-M)_y$, wherein B is hydrogenated isoprene, M is t-butylmethacrylate, and Z is a core of divinylbenzene. A reactor was charged with 12,300 grams of dry cyclohexane and 1,360 grams of isoprene monomer. The cyclohexane and isoprene were titrated with sec-butyllithium to remove impurities, then 26.8 ml of 1.45 M sec-butyllithium was added to polymerize the isoprene. The isoprene was allowed to react for ten half-lives at about 60° C. Then 32 ml of 55% divinylbenzene was added to couple the star polymer.

A two liter Büchi reactor was charged with 1110 grams of the living star polymer solution. The stirred solution was reacted with 5.7 g of tBMA monomer, dissolved into 21.5 ml of cyclohexane, for 1 hour. The reaction was then quenched with 0.4 ml of methanol.

A second two liter Büchi reactor was charged with 1035 grams of the living polymer solution. The stirred solution was reacted with 5.3 grams of tBMA monomer, dissolved into 20 ml of cyclohexane, for 1 hour. The reaction was quenched with 0.3 ml of methanol. The polymer solutions from both Büchi reactors were then combined and hydrogenated with the nickel catalyst from Example 5 to remove the unsaturation in the polyisoprene blocks.

EXAMPLE 7

This example describes reaction of the base polymers in Examples 5 and 6 with amines to form amide groups. The conversion of the polymerized t-butylmethacrylate in Examples 5 and 6 to amide groups was carried out in an extruder. For this particular example a Brabender melt mixer was used. The Brabender was heated to 250° C. and 60 grams of polymer was added with the mixing blades at 100 rpm. When the melt was uniformly mixed, a mixture of N,N-diethylaminopropylamine (DAP) and Penrico Oil was added over 3 minutes time (the oil serves to prevent the DAP from vaporizing out of the Brabender before it can mix with the polymer melt). The sample was allowed to mix for 3 minutes longer and then was removed from the Brabender. FT-IR analysis shows conversion to the amide, the ester peak at 1726 cm$^{-1}$ is replaced with an amide peak at 1667 cm$^{-1}$. Analysis by FT-IR revealed that the conversion to amide was at least 80% based on the ratio of carbonyl absorbance to amide carbonyl absorbance.

What is claimed is:

1. A process for making a polymer, comprising the steps of:
   anionically polymerizing a conjugated alkadiene or an alkenyl aromatic compound to form living polymer molecules;
   anionically polymerizing a (1-methyl-1-alkyl)alkyl ester, (1-aryl-1-alkyl)alkyl ester, or derivatives thereof to form adjacent units of the ester on the living polymer molecules; and
   reacting the polymerized ester with an amine.

2. The process of claim 1, wherein the living polymer molecules comprise 1,3-butadiene or isoprene and the ester is t-butylmethacrylate or t-butylacrylate.

3. The process of claim 2, wherein the living polymer molecules comprise isoprene and the (1-methyl-1-alkyl)alkyl ester is t-butylmethacrylate.

4. The process of claim 3, further comprising the step of hydrogenating aliphatic unsaturation in the polymer molecules prior to reacting the polymer with the amine.

5. The process of claim 1, wherein the polymer molecules are heated to at least 170° C. in the presence of of a primary amine for a sufficient time to achieve substantially complete conversion of the ester groups to amide or imide groups.

6. The process of claim 5, wherein the polymer molecules are heated to at least 180° C. in the presence of N,N-diethylaminopropylamine while passing through an extruder having a devolatilizing section.

7. The process of claim 1, wherein the living polymer molecules are crosslinked in a star structure by reaction with divinylbenzene prior to polymerization of the ester.

8. A polymer molecule comprising polymerized units of a conjugated diene or a vinylarene and amide or imide groups derived from adjacent units of a (1-methyl-1-alkyl)alkyl ester, a (1-aryl-1-alkyl)alkyl ester, or derivatives thereof.

9. The molecule of claim 8, further comprising hydrogenation of the conjugated diene.

10. The molecule of claim 8, further comprising a crosslinked core of divinylbenzene.

11. The molecule of claim 8, wherein the peak molecular weight of the molecule ranges from 1,000 to 2,000,000.

12. The molecule of claim 8, wherein the amide or imide groups are produced by the process of reacting a primary amine with the polymerized ester.

13. The molecule of claim 12, wherein the primary amine is N,N-diethylaminopropylamine.

14. The molecule of claim 13, wherein the polymerized ester is polymerized t-butylmethacrylate.

* * * * *

UNITED STATES PATENT AND TRADEMARK OFFICE
CERTIFICATE OF CORRECTION

PATENT NO. : 5,338,802
DATED : August 16, 1994
INVENTOR(S) : Donn A. Dubois et al It is certified that error appears in the above-indentified patent and that said Letters Patent is hereby corrected as shown below:

On the title page, "Appl. No. 904,152" should read
--Appl. No. 994,152--.

Signed and Sealed this

Fifteenth Day of November, 1994

Attest:

BRUCE LEHMAN

Attesting Officer     Commissioner of Patents and Trademarks